April 26, 1949.

W. J. COTTON 2,468,174

APPARATUS FOR ELECTRICALLY TRANSFORMING MATERIALS

Filed May 6, 1943

Inventor,
William J. Cotton,
By Ivan P. Tashof,
Attorney

April 26, 1949.

W. J. COTTON

APPARATUS FOR ELECTRICALLY TRANSFORMING MATERIALS 2,468,174

Filed May 6, 1943

Patented Apr. 26, 1949

2,468,174

UNITED STATES PATENT OFFICE 2,468,174

APPARATUS FOR ELECTRICALLY TRANSFORMING MATERIALS

William J. Cotton, Chicora, Pa., assignor, by mesne assignments, to Koppers Company, Inc., a corporation of Delaware Application May 6, 1943, Serial No. 485,924

8 Claims. (Cl. 204—312)

This invention relates to a reactor apparatus wherein gaseous material is subjected to a plurality of crossed electrical discharges generated by crossed electrodes supplied with electrical energy of substantially different frequencies, said electrodes being positioned internally of the reactor chamber, one pair thereof being supplied with low frequency energy and the other pair of electrodes being supplied with high frequency energy.

The primary object of the present invention is to provide a simple, compact reactor apparatus adapted to efficiently and economically effect transformation of gaseous materials, said reactor apparatus being provided with a dielectric or insulating reactor chamber and a plurality of crossed electrodes positioned internally of the reactor chamber, said electrodes generating a plurality of crossed electric dicharges of different frequencies and producing a zone of crossed discharges. In one form of the invention, electrodes are provided with pointed electrode terminals.

Another object of the present invention is to provide an apparatus of the character set forth wherein all or some of the internal electrodes are provided with sheath members functioning to protect the reactor chamber from the heat that may be generated during the course of the electrochemical reaction, said sheath members, which are made of dielectric material, having the further function of directing the flow of gaseous material being treated, as, for example, a gaseous medium, into the composite discharge and around the electrode tips.

Another object is to provide in one form of the invention electrical terminals which project beyond the inner end of the sheath members, so that said terminals are not bathed in any vapors which may be emitted from the interior walls of said sheath members.

A still further object of the present invention is to provide a reactor apparatus in which the electrode gap between one pair of crossed electrodes is of a different magnitude than the electrode gap between the other pair of electrodes.

A further object of the present invention is to provide a reactor apparatus of the character set forth in which at least one electrode has a different ion emission potential than that of the remainder of the electrodes.

A further object of the present invention is to provide a reactor apparatus utilizing at least three pairs of crossed electrodes, some of said pairs of crossed electrodes being supplied with high frequency electrical energy of one frequency, and the remainder of said pairs of electrodes being supplied with electrical energy of a substantially different frequency. In one form of the invention the composite discharge is generated by three pairs of electrodes generating three crossed discharges, each discharge being generated by an electrical frequency of a different value, there being a substantial difference in value between said frequencies.

Another object of the present invention is to provide a reactor apparatus of the character set forth having a reactor chamber in which a catalyst is positioned in the zone of crossed discharges, said catalyst assisting in effecting the desired electrochemical transformation of the material being treated.

The reactor of the present invention is designed to use high frequency energy varying from about 60,000 cycles to 300,000 mc., or over, corresponding to a wave length varying between 500 meters and .1 centimeter, in conjunction with a low frequency energy which may vary from the lowest producible frequency, including 10, 25 and 60 cycles, to about 3,000 mc., said low frequency energy corresponding to a variation in wave length from about 3,000,000 meters for 10 cycles to 10 centimeters for 3,000 mc. The high frequency energy may be generated by an alternating current or by any other means now known in the art.

It is clear from the above that the present reactor apparatus is designed for the electrochemical transformation of materials wherein the two frequencies supplied to the crossed electrodes differ substantially in numerical value one from the other. The order of the difference is that the crossed frequencies simultaneously acting on a chemical material and transforming said chemical material, should produce an increase in yield of the final reaction product over the yield that would be produced in using only the particular low frequency of the crossed electrodes or in using only the particular high frequency of the crossed electrodes.

In accordance with the present invention, there is provided a reactor apparatus wherein by crossing low frequency energy and high frequency energy, the volume of the visible composite resulting arc per unit of energy supplied is greatly increased; that is, the energy density of the composite arc in watts per cubic centimeter is greatly decreased. Stated differently, the reactor of the present invention is characterized by the property, when operating, of producing a composite discharge which fills a larger volume than would be filled by the low frequency electrodes operating separately or the high frequency electrodes operating separately, when each of said electrodes is supplied with energy equal to the total energy supplied to the crossed electrodes.

The reactor of the present invention, in one of its forms, produces a corona discharge. In another form the discharges may be of the spark type or of the silent discharge type, or of the glow type.

The present invention will be disclosed in connection with the following drawings, in which

The curve C—D represents the yields obtained with various wave lengths employing the reactor set forth in Fig. 1 and a high frequency discharge alone. The curve E—F represents the yield obtained with various wave lengths employing the reactor set forth in Fig. 1 and crossed discharges, one discharge being generated by a 60-cycle low frequency current and the other discharge being generated by a high frequency discharge having a wave length corresponding with the abscissa.

Fig. 7 also sets forth a straight line A—B, which is intended to indicate the yield obtained using only 60-cycle low frequency current.

Figure 1:
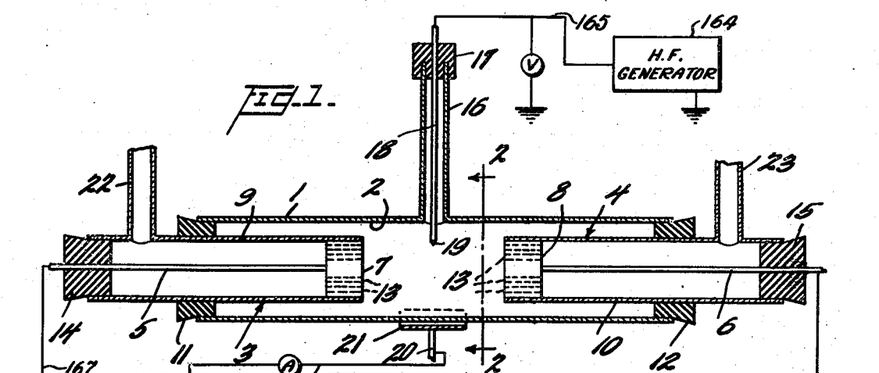
Fig. 1 is a cross-sectional view of a reactor apparatus capable of generating crossed discharges of the character herein described, said apparatus being provided with a high frequency electrode external to the reactor vessel, and an additional high frequency electrode internal of the reactor vessel.
Figure 2:
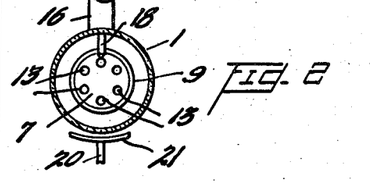
Fig. 2 is a transverse cross-sectional view taken on the line 2—2, looking in the direction of the arrows in Fig. 1.

The reactor apparatus as shown in Fig. 1 comprises a hollow reactor vessel 1 having an interior wall 2, said reactor vessel being made of non-conducting or insulating material, such as a ceramic material, including glass, and preferably a high melting glass, as exemplified by Pyrex. Within the reactor vessel 1 are positioned units 3 and 4, provided with electrode leads 5 and 6, said leads having button-like electrode terminals 7 and 8, which are made of a good conducting material, exemplified by metal or metal alloys which will not oxidize appreciably to such an extent as to destroy the function of the electrodes during the course of the reaction. The material of the electrodes will depend to a substantial extent upon the sustaining voltage required to maintain the composite discharge. As stated, the electrode material must not appreciably oxidize or melt at the temperature used during operating conditions. The electrode buttons or equivalent electrodes may consist of copper, silver, brass, iron, nickel, chromium, iron and chromium alloys, nickel and chromium alloys, or the like, tantalum, tungsten, tungsten alloys or tantalum alloys. The tantalum electrodes are capable of withstanding relatively high sustaining voltages without any substantial oxidation. While tungsten is not suitable for oxidation reactions, it may be employed in treating such chemicals or such compounds or mixture of compounds where oxidation is not present. However, where ammonia is subjected to the crossed discharges of the present invention under the conditions specified, tungsten may be used for either the high frequency or low frequency electrodes, or for both. The electrode terminals may be made of copper alloyed with about 2% of lithium, as is well known in the prior art.

The buttons 7 and 8 are mounted in sheaths 9 and 10, which are positioned centrally of the reactor vessel 1. These sheaths are mounted in and pass through airtight insulating supports 11 and 12, which may be made of rubber, cork, or similar material. The button electrodes 7 and 8 are provided with a plurality of passageways 13 which function to split the reacting gaseous medium into a plurality of pencil-like streams, so as to better insure the contact of the gaseous medium being treated with the composite discharge. The outer ends of the sheaths 9 and 10 are respectively closed with tight insulating closures 14 and 15. The reactor vessel has sealed into its wall a tubular member 16 closed at its outer end with a closure member 17 which is perforated and through which there passes the high frequency electrode 18, which is made of any of the materials herein set forth. The reactor apparatus is preferably provided with an external electrode 20 having a terminal 21, said electrode being made of a conducting material. Preferably the electrode terminal consists of a suitable sheet of metal, such as copper, shaped to the contour of the reactor vessel 1 so as to preferably inclose an arc varying from 40° to 80° with the tip 19 of the internal electrode, said tip serving as a center of curvature. The external electrode terminal 21 is shaped to draw the corona discharge emanating from the electrode terminal tip 19 centrally downwardly between the button electrodes 7 and 8, thereby insuring maximum efficiency and yield. The external electrode terminal 21 may be placed in direct contact with the outer wall of the reactor vessel or tube 1 but is preferably spaced at such a distance from the external wall of the reactor vessel as to inhibit any substantial heating of the wall. In practice, it has been found that, if the external terminal 21 is from 1 to 2 mm. from the external wall of the reactor vessel, satisfactory results are obtained.

It is desired to point out that the reactor depicted in Fig. 1 need not necessarily be mounted in the position shown, but that it may be turned to any convenient angle and even inverted.

The reactor apparatus herein disclosed is particularly adapted for the treatment of nitrogen- and oxygen-containing media to produce nitrogen oxides. In order that the operation of the apparatus may be understood, the production of nitrogen oxides will now be set forth. The nitrogen- and oxygen-containing medium which is to be treated in the apparatus, after being dried in the drying arrangement set forth in Fig. 6, and in the manner hereinafter described, enters through the inlet member 22, passes through the sheath 3, the button electrode 7, and through the composite or crossed discharge. The reaction product passes through the electrode terminal 8 and sheath 10, and leaves the reactor vessel by means of the exit conduit 23. The reaction product passes through a medium for extracting its nitric oxide content, the precise method of extraction being hereinafter set forth in connection with the description of Fig. 6.

It is desired to point out that for the button electrodes 7 and 8 there may be substituted sharpened or pointed electrodes. When the electrode terminals are in the shape of sharpened points, the sheaths 9 and 10 may be omitted, but it is highly desirable to retain them in order to force the flow of the gaseous medium being subjected to the action of the composite discharge in and around the electrode tips. Further, it is desired to point out that the sheaths 9 and 10 function to a large extent to protect the outer vessel 1 from the effect of heat that may be produced during the course of the reaction.

The apparatus herein set forth may be utilized to produce nitric oxide from atmospheric air in accordance with the following, which is identified as "Example I."

The diameter of the reactor vessel 1 is 32 mm. The inner sheaths 9 and 10 are approximately 23 mm. in diameter. The overall length of the tube is 10". The flow of dried air is initiated through the inlet member 22, said air passing through the reactor vessel 1 at a velocity of 356 cc. per minute standard conditions, the pressure within the reactor vessel being maintained at 174 mm. of mercury. There is applied to the high voltage low frequency electrode terminals 7 and 8 a voltage of 2160 volts. The electrode terminals are spaced 60 mm. apart. When employing a brass internal high frequency electrode 18 and a wave length of 142 meters, there is applied to the high frequency terminals 19 and 21 a high frequency tension or potential of about 2050 volts. A wave length of 142 meters corresponding to a frequency of 2.11 mc. As soon as the high frequency potential has been applied to the high frequency electrodes, the high frequency arc will strike and this will function to initiate the striking of the high voltage low frequency discharge. Immediately upon the striking of the high voltage discharge, its potential drops to approximately 800 volts. Also when the high voltage low frequency discharge strikes, its voltage likewise markedly drops. Should either discharge fail to strike promptly, striking may be readily induced by the use of a Lepal coil as a tickler in the usual manner. In this particular example, the low frequency discharge strikes immediately, whereupon the voltage across the terminals drops to approximately 800 volts. The current of the low frequency discharge approximates 120 milliamperes (ma.), while the current of the high frequency discharge approximates 90 ma., as measured on the thermomilliammeter in the power amplifier plate circuit of the high frequency generator. The exit gases leave the reactor through the exit conduit 23, said exit gases comprising a predominating quantity of nitric oxide NO, unreacted quantities of nitrogen and oxygen and traces of nitrogen dioxide $NO_2$, and nitrogen tetroxide $N_2O_4$.

The treatment and handling of the gas, both prior to its entry into the reactor and subsequent to leaving same, is carried out as described in Example II below.

In this experiment the low frequency electrode terminals consist of an alloy comprising copper and 2% lithium. The exit gases of the character set forth pass with relatively high speed through the relatively short exit member to silica gel absorbers, where the nitrogen oxides are absorbed and the increase in weight noted, the specific apparatus being set forth in Fig. 6.

It is desired to point out that the time interval between formation of the nitrogen oxides and their absorption by silica gel is only a small fraction of a second, so that of the total nitrogen oxides only a negligible amount is present as nitrogen dioxide $NO_2$ or nitrogen tetroxide $N_2O_4$. Particularly is this true in view of the fact that the reaction is carried out at the relatively low pressure of 174 mm. mercury. This permits, for purposes of calculation, the assumption that all of the nitrogen oxides absorbed are present as nitric oxide NO.

The yield of nitric oxide calculated as nitric acid is calculated as follows:

$$\frac{\text{Wt. of nitric oxide (gms.)} \times \text{mol. wt. } HNO_3}{\text{Time (hrs.)} \times \text{mol. wt. } NO \times \text{ave. kilowatts supplied to composite discharge}}$$

Grams nitric acid per kilowatt hour

Figures 4, 7:
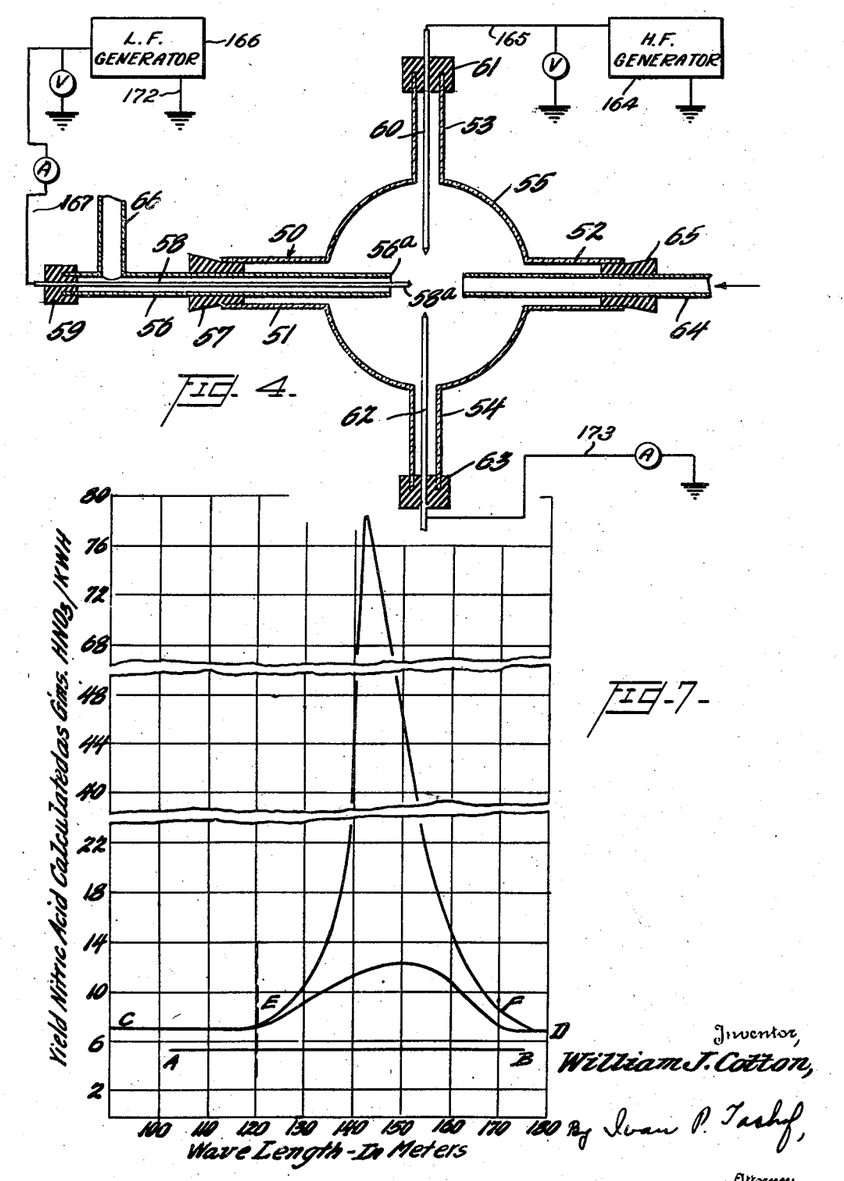
Fig. 4 is a cross-sectional view of a modified reactor apparatus in which one electrode serves as a common ground.
Fig. 7 is a set of curves depicting the results obtained when using the reactor set forth in Fig. 1. The abscissa indicates wave lengths, lambda λ, in meters and the ordinate indicates the yield of nitric oxide calculated as grams of nitric acid per kilowatt hour.

At the time that the curves of Fig. 7 were determined, a high frequency voltmeter and thermomilliammeter were not available for inclusion in the tank circuit, and accordingly the readings of the voltmeter and thermomilliammeter in the power amplifier plate circuit were used as a basis for computing the energy supplied to the composite or crossed discharge as high frequency energy. On this basis, the yield calculates to 78.0 grams nitric acid per kilowatt hour. Obviously, the energy assumed supplied as determined by these meters is too high, which means that the yield of 78.0 grams is too low. Subsequently, when meters became available and the efficiency of energy transfer from power amplifier plate to tank circuit could be determined and this factor applied as a correction factor, the yield as recalculated using this correction factor is 144.4 grams nitric oxide calculated as nitric acid per kilowatt hour.

It has been previously proposed, when producing nitric oxide with a high frequency discharge alone, to measure yields of nitric oxide calculated as nitric acid by dividing the yield as indicated above by a power factor. Power factors that have been thus used have been ranged approximately .98 for 60-cycle frequency to as low as .12 for a frequency of 30 meters (10 mc.). In calculating the yields of the present invention the power factor has been ignored, which, had it been used, would have still further greatly increased the yield herein set forth.

It has been stated that the velocity of the air passing through the reactor vessel 1 is about 356 cc. per minute. It is important, in connection with the velocity of the air passing through the reactor vessel, to supply sufficient air per minute so that maximum yield for the frequency used may be obtained. This means that, operating with different high frequencies, varying minimum rates of flow are required in accordance with the frequency used. It has been discovered that when the crossed discharge method is used to treat chemical material the velocity of the material flowing through the reactor vessel must be greatly increased for frequencies corresponding with peak yields; and that the velocity of the air passing through the reaction zone, that is, subjected to the action of the crossed discharges, may be decreased when the reaction is carried out at frequencies which do not give maximum yield.

In other words, if a minimum velocity curve were plotted to give the best yield at varying high frequencies, said curve would follow the contour of curve E—F of Fig. 7.

It has been discovered that, when using a crossed discharge method to treat chemical material, for any particular frequency there is a critical lower limit for the velocity of the air that is passing through the reactor vessel. If the velocity of flow of the air or any other gaseous material passing through the reactor vessel is decreased below this minimum, then for the given high frequency the yields are rapidly reduced. On the other hand, if the velocity of the gaseous material passing through the reactor vessel is increased above this minimum critical velocity, the increase in yield is relatively small and does not correspond to the increase in velocity.

For example, for a given set of operating conditions where all variables remain constant, including the percentage of high frequency energy to the total energy, if the velocity is decreased 10% below the critical minimum value, there is approximately a 10% decrease in the yield obtained. However, if the velocity is increased 10% over the minimum velocity, there is no corresponding 10% increase in yield. Not only does this relationship hold for crossed discharges but it also holds when the chemical material is subjected to the action of a high frequency discharge which is not crossed with a low frequency discharge.

Referring to Fig. 7, there is shown therein the yields obtained using the reactor set forth in Fig. 1. The curve E—F represents the yields obtained with wave lengths varying between 100 and 180 meters, which corresponds to a frequency varying from 3 mc. to 1.67 mc. This curve shows that under operating conditions set forth in the above example the maximum yield was obtained at approximately 142 meters, which corresponds to a frequency of 2.11 mc. This yield peak was obtained when, of the total energy used, the high frequency energy approximates 38% of the total energy supplied to the crossed discharges, the remainder being contributed by the low frequency component which was supplied at a frequency of 60 cycles per second, a relatively high voltage being used. If the percentage of high frequency energy is increased or decreased the peak yield is decreased, but the critical frequency for best yields at said amount of high frequency energy will remain at approximately 142 meters or 2.11 mc., but the yield will not be as great. Therefore, by maintaining all other operating conditions substantially constant and varying either the wave length or the proportion of high frequency energy supplied to the crossed discharges, the yield may be varied, or both of these factors may be varied to vary the yield. While it is the material object of the present invention to adjust these factors so as to obtain the maximum yield and to operate at approximately 142 meters or 2.11 mc., the present invention supplies a method for varying the yields if, for some special reason, a lower yield than the maximum yield is desirable.

In Fig. 7 the curve C—D represents the yields obtained when using the high frequency discharge alone with wave lengths varying between 100 and 180 meters or a frequency of 3 to 1.67 mc. and in the reactor as set forth in Fig. 1.

The maximum yield for curve C—D, said curve being derived from the operation of a reactor apparatus using only high frequency electrodes, is 12.2 grams per kilowatt hour.

The maximum yield indicated in curve E—F, resulting from the use of crossed discharges of the character herein set forth, was 78.0 grams per kilowatt hour. When high voltage is used alone to produce nitric oxide under the operating conditions herein set forth, the yield is only 5.3 grams per kilowatt hour, as indicated by straight line A—B. The maximum yields of 12.2 grams and 78.0 grams per kilowatt hour are subject to the same correction as hereinbefore referred to. However, the important point is that these figures show the relative advantage of working with crossed discharges over a high frequency discharge alone.

Figure 3:
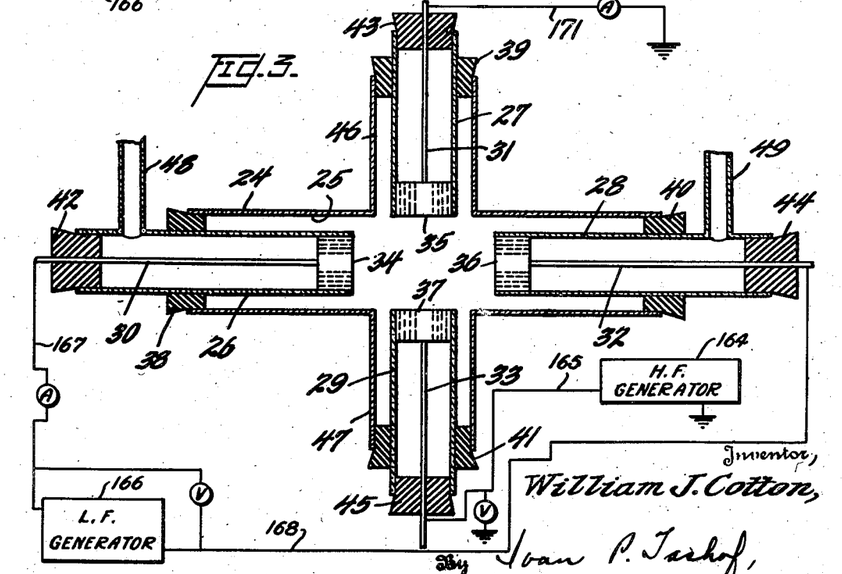
Fig. 3 is a cross-sectional view of a reactor similar to that shown in Fig. 1, in which both of the high frequency electrodes are internal.

The reactor apparatus set forth in Fig. 3 is similar to the reactor set forth in Fig. 1 except that all the electrodes are internal electrodes. Referring to Fig. 3, there is provided a hollow reactor vessel 24 having an interior wall 25, said reactor vessel being made of a non-conducting or insulating material of the character previously specified in connection with Fig. 1. Within the reactor vessel 24 are positioned sheath-like members 26, 27, 28 and 29 which enclose electrode leads 30, 31, 32, and 33 having button-like electrode terminals 34, 35, 36, and 37 respectively. These terminals may be made from any of the metals or alloys set forth in connection with Fig. 1. The sheaths 26, 27, 28 and 29 are respectively mounted in insulating closure members 38, 39, 40 and 41, and the exterior ends of the sheath members are closed by airtight insulating closures 42, 43, 44 and 45 respectively. The reactor vessel has sealed in its wall tubular extending members 46 and 47 which are preferably positioned at right angles to the horizontal member of the reactor vessel, although said extending members may be positioned at any other angle to the horizontally extending reactor vessel. In other words, the position of the members of the reactor vessel define the position of the low frequency and high frequency crossed discharges. The reactor 24 is provided with inlet and outlet members 48 and 49.

The reactor unit shown in Fig. 4 comprises a reactor vessel 50 provided with horizontally extending members 51 and 52 and vertically extending tube-like members 53 and 54, the latter projecting from the spherical member 55. Extending through the horizontal member 51 is a sheath-like member 56 which is mounted in an insulating closure member 57. Projecting within the sheath member 56 is a low frequency electrode 58, the latter being mounted in an insulating closure member 59, which also acts as a closure for the member 56. The electrode 60 is a high frequency hot terminal electrode. Projecting through the reactor member 54 is an electrode 62, the latter being mounted in an insulating closure member 63. The electrode 62 is the ground electrode for both the high frequency circuit and the low frequency circuit, serving as a common ground.

The gaseous medium enters through the inlet conduit 64 which is centrally mounted in the reactor member 52, the latter being provided with a closure member 65. It is to be noted that the inlet member 64 preferably extends well into the discharge volume in order to insure intimate contact of the entering gaseous medium with the composite or crossed discharge. The reacted gaseous product passes first through the reactor sheath 56 and then leaves the reactor by the exit conduit 66. Both the high frequency electrodes and the low frequency electrodes may consist of any of the metals or alloys herein set forth or equivalents known in the art. The high frequency gap may vary between 15 and 25 mm. and the gap between the low frequency electrode and the ground electrode may also vary between 15 and 25 mm. Obviously, this gap may vary according to operating conditions. Instead of arranging the electrodes as shown in Fig. 4, any of the three electrodes may be the ground electrode and the other two electrodes respectively become the high frequency electrode and the low frequency electrode, and these may be interchanged so that either one is the high frequency or the low frequency electrode.

It is desired to point out that the electrode tip 58a projects beyond the end 56a of the sheath. Under some circumstances, this is a desirable construction, as this insures that the tip of the low frequency electrode is not subjected to the influence of any volatile constituents emanating from the interior wall of the sheath 56. If the sheath is made of glass it may emit active constituents, which may be sodium vapor or sodium ions. There is a tendency for the results to be non-uniform if the tip 58a is enclosed within the glass sheath. While it is stated that sodium may be responsible for this non-uniformity, it may be caused by other constituents of the glass.

Figure 5:
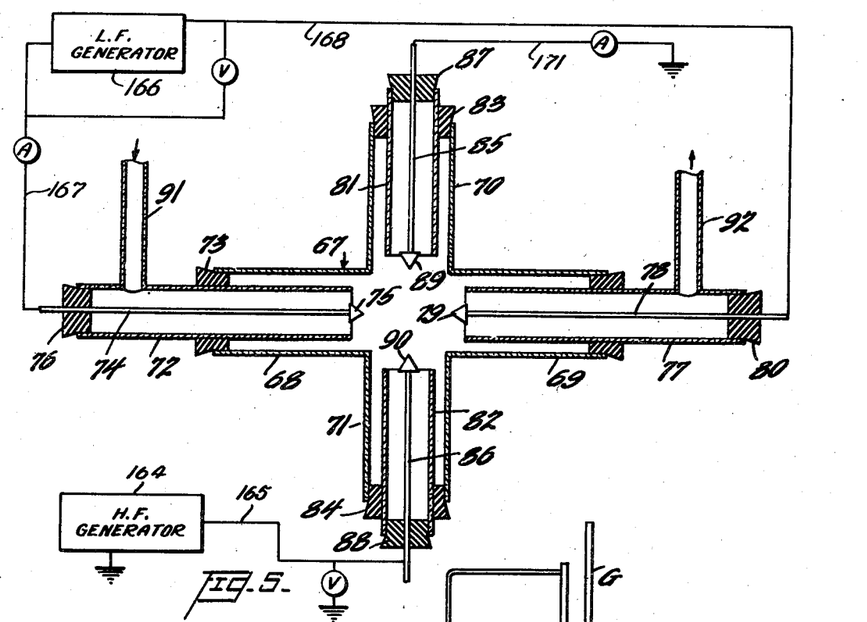
Fig. 5 is a reactor similar to that shown in Fig. 3, wherein there are employed electrodes whose tips are pointed.

The reactor unit set forth in Fig. 5 comprises a hollow horizontal member 67 provided with horizontal legs 68 and 69 respectively. The reactor is also provided with vertically extending reactor members 70 and 71.

Positioned within the horizontal reactor leg 68 is a sheath member 72 preferably made of glass, said sheath member being mounted in an insulating closure 73. Projecting through the reactor leg member 72 is an electrode 74 carrying a pointed electrode terminal 75. The electrode 74 is mounted in an insulating closure member 76. Positioned within the sheath 77 is a similar low frequency electrode 78 provided with an electrode tip 79. The outer end of the sheath carries an insulating closure 80 which functions as a mounting for the electrode 78. Positioned within the vertically extending reactor members 70 and 71 are glass sheath members 81 and 82 respectively, said members being mounted in airtight insulating closure members 83 and 84 respectively. Positioned within the sheath-like members 81 and 82 are the high frequency electrodes 85 and 86 which are respectively mounted in closure members 87 and 88.

The low frequency electrodes 74 and 78 and the high frequency electrodes 85 and 86 may be made of copper, brass, nickel, tantalum, silver, iron, chromium, nickel chromium alloys, nickel alloys, platinum alloys, and the like, and the electrode terminals may be made of the same material. Carbon electrodes may be used whenever an oxidizing atmosphere is not present. Alternatively, any of the electrodes may be made of said materials and provided with an electrode terminal of a different material. Further, the electrodes and the terminals 75, 79, 89 and 90 may be made of 98% copper with 2% lithium.

It is within the province of the present invention to have the low frequency electrodes and the electrode terminals made of one material, such as copper, and the high frequency electrodes and the electrode terminals made of another material, such as nickel, to thereby provide electrodes and electrode terminals of different ion emission potentials. It is further within the province of the present invention to make each of the electrodes and electrode tips of different conducting metals or alloys so as to provide electrode tips, each chosen to have its own selective ion emission potential.

As shown in Fig. 5, the crossed electrodes are all in the same plane, and said plane may be a vertical plane, a horizontal plane or any intermediate plane. It is within the province of the present invention to supplement the four electrodes as shown in Fig. 5 by an additional pair of either high frequency or low frequency electrodes. The additional pair of low frequency electrodes may have the same low frequency passing therethrough as the frequency which passes through electrodes 74 and 78, or the frequency may be greater for the additional set of electrodes, or less than the frequency of the current passing through electrodes 74 and 78. The additional set of electrodes may be high frequency electrodes and the current passing therethrough may have a higher or a lower frequency than that passing through high frequency electrodes 85 and 87. This arrangement may be called the "triple discharge" arrangement.

The following sets forth the results of what is herein termed, for the purpose of identification, Example II:

The crossed discharge reactor set forth in Fig. 5 is provided with terminal electrodes comprising an alloy of copper with 2% lithium. The current passing through the low frequency electrodes 74 and 78 and electrode terminals 75 and 79 is 60 cycles per second. The current passing through the high frequency electrodes 85 and 86 and the electrode terminals 89 and 90 is 120 meters or 2.5 mc. The low frequency 60-cycle current uses 20 milliamperes at 820 volts. The 2.5 mc. high frequency current, 120 meters wave length, uses 18 milliamperes at 500 volts. The electrode gap between the low frequency electrode terminals 75 and 79 is 30 mm. and the electrode gap between the high frequency electrode terminals 89 and 90 is 21 mm. The total power supplied to the reactor is 25 watts. Of this the low frequency power is 16 watts and the high frequency power is 9 watts. Therefore, the high frequency energy power contributed 36% of the total energy.

Air is introduced to the inlet conduit 91 and passes into the sheath member 72, and then is subjected to the influence of the composite crossed discharge. The reaction product passes through the sheath 77 and out to the silica gel absorbers through the exit pipe 92. Air is supplied to the reactor at the rate of 518 cc. per minute under standard conditions, but the pressure maintained within the reactor throughout the run is 338 mm. mercury pressure. This corresponds to a pressure of 44% of an atmosphere.

Figure 6:
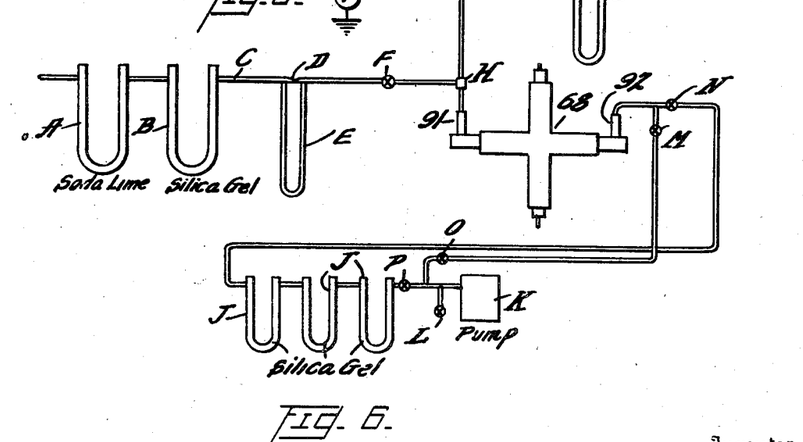
Fig. 6 is a diagrammatic representation of an apparatus for drying the air prior to its introduction into the reactor and for absorbing the nitric oxide content of the exit reaction gases.

The air is dried prior to its introduction to the reactor vessel 68 of Fig. 6 by passing it through the soda lime tube A, then through the silica gel tube B, thence through the conduit C, through the orifice D of the differential manometer E, through the valve F, and thence to the reactor 68. At the point H is connected the mercury manometer G which measures the internal pressure of the reactor. From the reactor 68 the exit gases pass through exit conduit 92 to a series of silica gel absorber tubes J, which tubes extract the nitric oxide content of the exit gases. A vacuum is applied by means of the vacuum pump K and the amount of vacuum adjusted by means of the release valve L and the main valve F in the supply line. The soda lime functions not only to take out a portion of the moisture but also to extract from the air substantially all of the carbon dioxide. The air as delivered to the reactor 68 has a moisture content of about 5 to 8 mg. of moisture per liter. When the run is started, the valves N and P are closed and M and O are open. When operation has reached equilibrium, valves N and P are quickly opened and valves M and O closed, noting the time of doing so with a stop-watch. Upon conclusion of the run, valves M and O are opened while N and P are closed.

The time interval during which the valves N and P are open to the absorbers and the valves M and O of the by-pass are closed is six minutes. During this period the silica gel is absorbing the nitric oxide produced by the reaction. After the run is terminated, the silica gel tubes are weighed and the increase in weight taken as the weight of nitric oxide produced in the six minutes. In this example, there was produced, under the operating conditions above described for a period of six minutes, 126.6 mg. of nitric oxide. The yield on this data calculates to 106.1 grams of nitric acid per kilowatt hour. While in this particular experiment, where the reaction pressure is less than one-half atmosphere, the gas is absorbed in the silica gel, when the pressure is in excess of one-half atmosphere the reaction gas may be passed into a balloon flask, where the gas is retained for a sufficient length of time to permit the nitric oxide content of the gas to be converted to $N_2O_3$ and/or $N_2O_4$. From the balloon flask the gas may be drawn through an accurately measured volume of standardized caustic soda contained in bubble absorbers, and thereafter the excess of unreacted caustic soda titrated.

The reactors herein disclosed may be provided with tantalum electrodes. The combination of crossed discharges with tantalum electrodes results in a higher yield than is obtained using crossed discharges with any of the other electrode materials herein described. The tantalum electrodes provide the further advantage that they have a high melting point and do not oxidize appreciably at relatively high temperatures. This increase in yield is very marked when using crossed electrodes of the character herein set forth and a high frequency within the range of 25 meters to 175 meters, corresponding to 12 mc. to 1.71 mc.

In Example I, which has hitherto been set forth as illustrative of the present invention but not acting as a limitation of the scope of the invention, the electric discharge is a visible one of the corona-glow type. When the reaction is carried out in reactors such as set forth in Figs. 3 and 5, the discharge may be of the glow, silent, corona or spark type. If the pressure at which the reaction is carried out is above about one-half atmosphere, the discharge tends to be a corona or spark discharge, but at pressures below about one-half an atmosphere the characteristics of a glow type discharge begin to become apparent, and become increasingly pronounced as the pressure decreases. This pressure may be decreased until it approaches a vacuum as a lower limit. This is not characteristic of a discharge using low frequency energy except at pressures below about 10 cm. of mercury or of a discharge using high frequency energy alone except at pressures below about 20 cm. of mercury.

In Example I, which has hitherto been set forth as illustrative of the present invention but not acting as a limitation as to the scope of the invention, the electric charge is visible, partaking of the characteristics of both the glow and corona types of discharges. If the pressure at which the reaction is carried out is above about one-half atmosphere, the discharge approaches more nearly the corona type of discharge, but at pressures below about one-half atmosphere the characteristics of a glow type discharge begin to become more pronounced as the pressure decreases. This pressure may be decreased until it approaches a vacuum as a lower limit. This is not characteristic of a discharge using low frequency energy except at pressures below about 10 cm. of mercury or of a discharge using high frequency energy alone except at pressures below about 20 cm. of mercury.

The reactor may be operated with crossed electrodes, one set of electrodes producing a silent discharge and the other set of electrodes producing either a corona or glow discharge. More specifically, in operating the reactor of the present invention, there may be a discharge between either the low frequency electrodes or the high frequency electrodes, and the discharge between the other pair of electrodes may be a silent discharge.

In a reactor such as set forth in Fig. 1, a silent discharge between the high frequency electrodes is, for all practical purposes, substantially impossible. Further, a spark discharge between the high frequency electrodes is not practicable, as the spark almost immediately punctures the wall of the reactor chamber. Therefore, in operating a reactor of the type shown in Fig. 1, the conditions of operation should be adjusted so that a spark discharge does not occur between the high frequency electrodes. With a reactor of the type set forth in Fig. 1, two types of discharges are feasible between the high frequency electrodes, namely, a corona discharge and a glow discharge. The factors which determine which kind of discharge is obtained are frequency, amount of discharge as measured in terms of milliamperes and voltage, and pressure. To some extent, the electrode material also determines the type of arc obtained. In general, however, if all factors remain constant, then as pressure increases above about one-half atmosphere, the tendency will be to shift from the glow to the corona discharge; and as the pressure decreases below one-half atmosphere, the tendency will be in the reverse direction, namely, towards a glow discharge. In the experiment herein set forth, operating under a pressure of 174 mm. of mercury, the discharge partook of the characteristics of both the corona and glow types of discharges.

In connection with the above, it is desired to point out that, using crossed discharges, the discharge very frequently partakes of the character of both a glow and corona discharge. However, under the particular conditions at which the herein set forth experiment was carried out, below about one-half atmosphere the tendency was for the glow discharge to predominate, and above about one-half atmosphere there was a tendency for the crossed discharge to be a composite medium, which is the result of flow and corona discharges, in which the corona discharge predominates. However, under some circumstances, the reactors herein disclosed, and, in general, reactors using crossed discharges generated by high frequency and low frequency energy of the character herein set forth, may be operated to give either glow or corona discharges above one-half atmosphere, or to give either glow or corona discharges below one-half atmosphere.

Referring to the type of reactor set forth in Fig. 1, between the low frequency electrodes any type of discharge can be utilized, and therefore the composite discharge may be the result of a silent discharge between the low frequency electrodes and a corona discharge between the high frequency electrodes; or that obtained by a spark discharge between the low frequency electrodes and a glow discharge between the high frequency electrodes; or that obtained when there is a corona discharge from both pairs of electrodes; or that obtained when there is a glow type of discharge from both of the electrodes.

By "glow discharge" is meant a discharge which consists of a soft diffusion of light throughout the entire volume of space between the electrodes. This may be, although not necessarily, simultaneously accompanied by an almost complete lack of incandescence of the electrodes themselves. The glow discharge does not have a definite boundary, as is characteristic of the corona discharge. The glow is not usually of uniform intensity throughout the volume between the electrodes, the intensity being greater along the axis between the electrodes and tapering off gradually to the confines of the reactor tube.

If the energy supplied be increased, the electrodes will become incandescent without appreciably affecting the glow characteristics of the discharge.

The corona discharge emanating from the internal high frequency electrode possesses rather definite boundary characteristics, and appears as an ovoid, or a bush-like projection, extending downwardly toward the external high frequency electrode.

Figure 8:
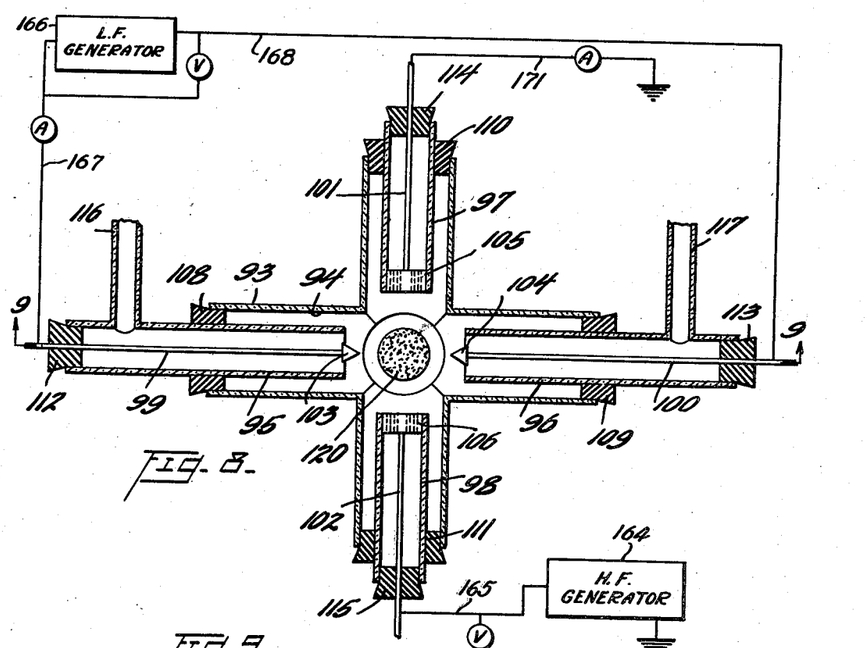
Fig. 8 is a cross-sectional view of a reactor capable of generating crossed discharges of the character herein described, said apparatus being provided with a pair of high frequency electrodes and a pair of low frequency electrodes, and means for interposing a catalyst within the volume of the crossed discharges.

The reactor set forth in Fig. 8 is similar to the reactor set forth in Fig. 3, except that one pair of electrodes is provided with pointed terminals. Referring to Fig. 8, there is provided a reactor vessel 93 having an interior wall 94, said reactor vessel being of a non-conducting or insulating material of the character previously set forth in connection with Figs. 1 and 3. Within the reactor vessel 93 are positioned sheath-like members 95, 96, 97 and 98, which enclose electrode leads 99, 100, 101 and 102, leads 99 and 100 being provided with pointed electrode terminals 103 and 104 respectively, and leads 101 and 102 being provided with button electrodes 105 and 106 respectively. These terminals may be made from any of the metals or alloys previously herein set forth, at least one of said electrodes and/or electrode terminals being, in one form of the invention, of different ion emission potential than the others.

The sheaths 95, 96, 97 and 98 are mounted in insulating closure members 108, 109, 110 and 111, and the exterior ends of the sheath members are enclosed by closures 112, 113, 114 and 115. The gas is introduced through the inlet 116 and the reaction product passes from the reactor through the exit member 117.

Interposed preferably in the center of the discharge volume is a catalyst carrier or holder 118, said carrier being provided by the closed end of a ceramic tube 119, which preferably passes into the center of the discharge volume. The end of the catalyst carrier has positioned thereon a catalyst 120 or a combination of catalytic mediums, as, for example, vanadium oxide, molybdenum oxide, or other refractory non-volatile metals, oxides, or salts, or combinations thereof. The catalyst may be heated if desired by means of a heating element 121 passing up through the tube 119. This tube is positioned in a tubular element 122 which extends from the reactor 93, as particularly shown in Fig. 9. A closure member 123 seals the reactor tube or leg 122.

Figure 10:
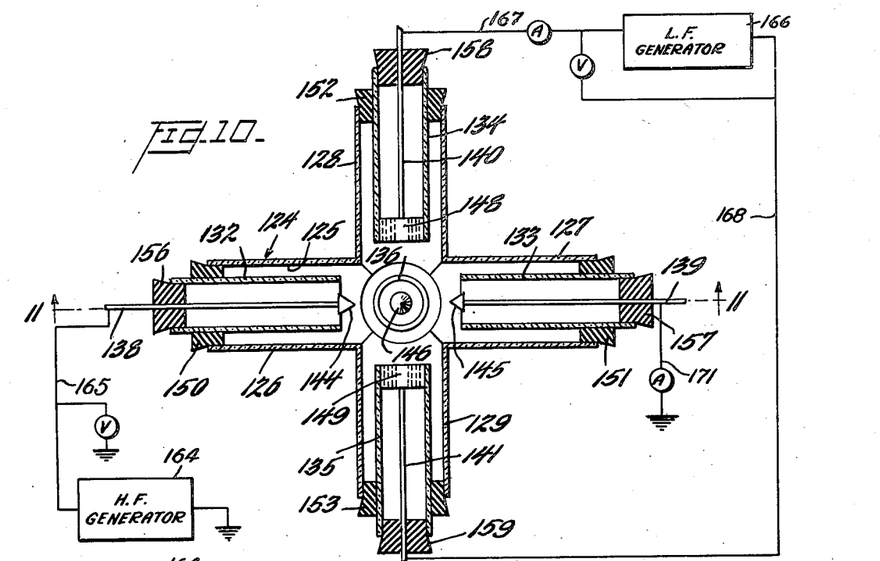
Fig. 10 is a cross-sectional view of a reactor employing three pairs of internal electrodes, at least one pair of which utilizes high frequency energy, two pairs of the electrodes being in one plane and the third pair of electrodes being positioned on an axis through the center of the discharge emanating from said two pairs of electrodes.
Figure 11:
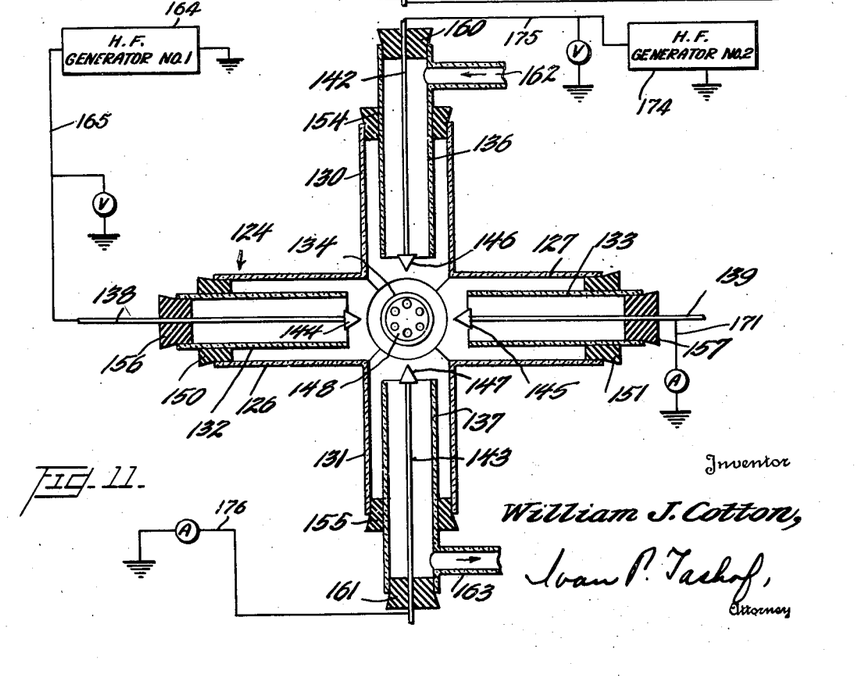
Fig. 11 is a cross-sectional view on the line 11—11 of Fig. 10.

As shown in Figs. 10 and 11, the reactor is provided with three pairs of internal electrodes, at least one pair of which utilizes high frequency energy. Two pairs of electrodes are positioned in one plane and the third pair of electrodes is positioned on an axis through the center of the discharge emanating from said two pairs of electrodes.

As shown in Figs. 10 and 11, there is provided a reactor vessel 124 having an interior wall 125, said reactor vessel being of a non-conducting or insulating material. The reactor chamber 124 comprises tubular members 126, 127, 128, 129, 130 and 131. Opposing pairs of tubular members are positioned at an angle to the other pairs of tubular members. Preferably the tubular members 126 and 127 are positioned at a right angle with respect to the tubular members 128 and 129, although this angle may vary. As shown in Fig. 11, the tubular members 130 and 131 are positioned at a right angle to the tubular members 126 and 127 and are in a different plane therefrom. However, it is within the province of the present invention to have the third pair of the electrode tubes in the same plane as the other pairs of electrode tubes.

Within the tubular reactor members 126 to 131 inclusive are sheath-like members 132 to 137 respectively, said sheath-like members enclosing electrode leads 138 to 143 respectively. The electrode leads 138 and 139, 142 and 143 are provided with pointed electrode terminals 144 to 147 respectively, and the electrode terminals 140 and 141 are provided with button-like electrodes 148 and 149. These terminals may be any of the metals or alloys previously herein set forth, at least one of said electrodes and/or electrode terminals being, in one form of the invention, of different ion emission potential than the others.

The sheath members 132 to 137 inclusive are mounted in insulating closure members 150 to 155 respectively, and the exterior ends of the sheath members are closed by closures 156 to 161 respectively. The gas is introduced through the inlet 162 and the reaction product passes from the reactor through the exit 163. In the reactor shown in Figs. 10 and 11, one pair of electrodes may serve as the high frequency electrodes and the other two pairs may be low frequency electrodes, or two pairs of electrodes may serve as high frequency electrodes and the third pair of electrodes may be low frequency electrodes.

Instead of using three pairs of electrodes, a greater number of pairs of electrodes may be used in order to produce effectively a composite discharge atmosphere. Some of the pairs of electrodes or a single pair of the electrodes may generate a low frequency discharge and the other pairs of electrodes may generate a high frequency discharge, or vice versa. In other words, at least one of a plurality of pairs of electrodes must generate a low frequency discharge, and the remainder of the plurality of pairs of electrodes can generate a low frequency discharge or a high frequency discharge.

Various kinds of discharges, or a combination of various kinds of discharges, such as hereinbefore referred to, may be generated in the reactors shown in Figs. 8 to 11 inclusive. The reactor shown in Figs. 10 and 11 may be provided with a catalyst carrier of the character shown in Figs. 8 and 9.

The hook-up of the high frequency generating unit used for producing the high frequency energy supplied to the tank circuit connecting the generator and the reactor and the tank circuit used in the herein described example is set forth in copending application Serial No. 483,931, filed April 21, 1943, now abandoned.

Means are provided for producing a high frequency discharge. As shown in Figure 1 there is provided a high frequency generator 164 connected to the high frequency electrode 18 by means of the lead 165. The external high frequency electrode 20 is connected to the ground 170 by the lead 169. The low frequency generator 166 is connected to the low frequency electrodes 5 and 6 by leads 167 and 168, respectively.

In the apparatus shown in Figure 3 the high frequency generator 164 is similarly connected to the electrode 33 by means of the lead 165, and the high frequency electrode 31 is connected to the ground by means of a lead 171. The low frequency generator 166 is connected by leads 167 and 168 to electrodes 30 and 32, respectively.

Referring to Figure 4, the high frequency generator 164 is connected by the lead 165 to the high frequency electrode 60. The low frequency generator 166 is connected by the lead 167 to the low frequency electrode 58.

The electrode 62 which is a common ground electrode for electrodes 58 and 60, respectively, is connected by a lead 173 to ground.

Referring to Figure 5, the electrical hook-up is similar to that set forth in connection with Figure 3.

Figure 9:
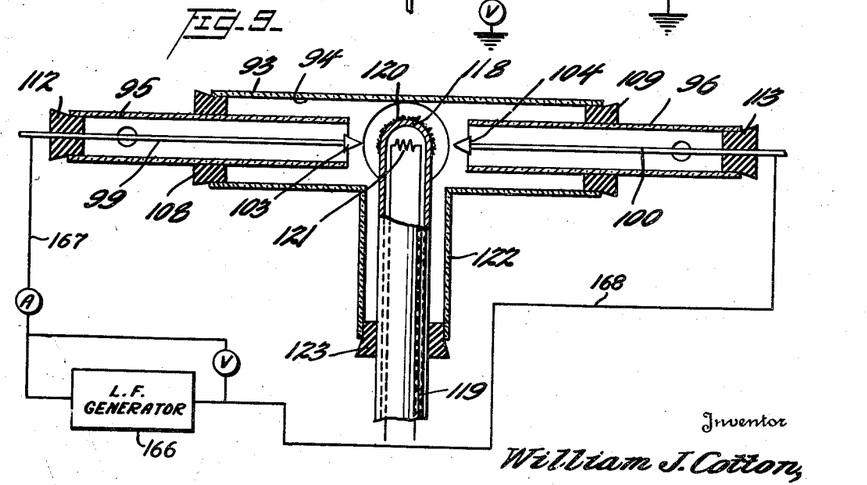
Fig. 9 is a transverse cross-sectional view taken on the line 9—9 of Fig. 8.

Referring to Figures 8 and 9 which are two views of the same reactor the high frequency generator 164 is connected to the high frequency electrode 102 by means of the lead 165. The high frequency electrode 101 is connected to ground by means of lead 171.

The low frequency generator 166 is connected to the low frequency electrodes 99 and 100 by leads 167 and 168, respectively.

Referring to Figures 10 and 11, there are shown two views of the same reactor which embody the use of three separate cyclic circuits.

Referring specifically to Figure 10 the low frequency generator 166 is connected by lead 167 to the low frequency electrode 140 and by lead 168 to low frequency electrode 141. The high frequency generator 164 is connected to the high frequency electrode 138 by the lead 165. The high frequency electrode 139 is connected to ground by the lead 171.

Referring to Figure 11 the connections for the electrodes 138 and 139 are similar to the high frequency connections shown in Figure 10. In order to supply the electrodes 142 and 143 with high frequency energy a second high frequency generator 174 is connected by the lead 175 to the electrode 142, and electrode 143 is grounded by lead 176.

Apparatus employing an external electrode such as shown in Figure 1 of the present drawing is described and claimed in applicant's copending application Ser. No. 485,058. That form of the apparatus shown in Figure 4 of the accompanying drawing is claimed in applicant's copending application Ser. No. 490,904, filed June 15, 1943.

The critical operating wave length of 142 meters is included in a range claimed in applicant's copending application Ser. No. 553,426, filed September 9, 1944.

What is claimed is:

1. In a gas discharge apparatus for effecting the electrochemical transformation of gaseous material, the combination of a reactor having a reaction chamber, means for producing cyclic electrical discharges of different frequencies and which cross each other to form a composite discharge, including a plurality of pairs of electrodes positioned internally of said reaction chamber, each of said pairs of electrodes being separately spaced and crossed one with respect to the other, means for supplying cyclic electrical energy of a predetermined frequency to one of said pairs of electrodes, and separate means for simultaneously supplying cyclic electrical energy of a substantially different frequency to another of said pairs of electrodes, each of said electrodes being provided with a sheath member spaced from said electrodes and protecting the reaction chamber from heat effects, one of said sheath members being provided with a gas inlet and another of the sheath members being provided with a gas outlet, said sheath members directing the flow of gaseous material around and adjacent to the electrode terminals.

2. In a gas discharge apparatus for effecting the electrochemical transformation of gaseous material, the combination of a reactor having a reaction chamber, means for producing cyclic electrical discharges of different frequencies and which cross each other to form a composite discharge, including a plurality of pairs of electrodes positioned internally of said reaction chamber, each of said pairs of electrodes being separately spaced and crossed one with respect to the other, means for supplying cyclic electrical energy of a predetermined frequency to one of said pairs of electrodes, and separate means for simultaneously supplying cyclic electrical energy of a substantially different frequency to another of said pairs of electrodes, each of said electrodes being provided with a sheath member spaced from said electrodes and protecting the reaction chamber from heat effects, one of said sheath members being provided with a gas inlet and another of the sheath members being provided with a gas outlet, said sheath members directing the flow of gaseous material around and adjacent to the electrode terminals, said electrodes being provided with pointed electrode terminals projecting beyond the inner end of each sheath member, the projection of the electrode terminals beyond the sheath members preventing the terminals from being bathed in vapors emanating from the interior wall of each sheath member.

3. In a gas discharge apparatus for effecting the electrochemical transformation of gaseous material, the combination of a reactor having a reaction chamber, means for producing cyclic electrical discharges of different frequencies and which cross each other to form a composite discharge, including a plurality of pairs of electrodes positioned internally of said reaction chamber, each of said pairs of electrodes being separately spaced and crossed one with respect to the other, means for supplying cyclic electrical energy of a predetermined frequency to one of said pairs of electrodes, and separate means for simultaneously supplying cyclic electrical energy of a substantially different frequency to another of said pairs of electrodes, each of said electrodes being provided with a sheath member spaced from said electrodes and protecting the reaction chamber from heat effects, one of said sheath members being provided with a gas inlet and another of the sheath members being provided with a gas outlet, said sheath members directing the flow of gaseous material around and adjacent to the electrode terminals, at least one of said electrodes having a different ion emission potential than the others.

4. In a gas discharge apparatus for effecting the electrochemical transformation of gaseous material, the combination of a reactor having a reaction chamber, means for producing cyclic electrical discharges of different frequencies and which cross each other to form a composite discharge, including a plurality of pairs of electrodes positioned internally of said reaction chamber, each of said pairs of electrodes being separately spaced and crossed one with respect to the other, means for supplying cyclic electrical energy of a predetermined frequency to one of said pairs of electrodes, and separate means for simultaneously supplying cyclic electrical energy of a substantially different frequency to another of said pairs of electrodes, each of said electrodes being provided with a sheath member spaced from said electrodes and protecting the reaction chamber from heat effects, one of said sheath members being provided with a gas outlet, said sheath members directing the flow of gaseous material around and adjacent to the electrode terminals.

5. In a gas discharge electrode apparatus for effecting the electrochemical transformation of a gaseous material, the combination of a reactor having a reaction chamber, means for introducing the reacting material into the reaction chamber, means for removing the gaseous reaction product from said chamber, and means for producing cyclic electrical discharges of different frequencies and which cross each other to form a composite discharge which is visible throughout the entire volume of space between the electrodes of the apparatus, including a plurality of pairs of electrodes positioned internally of said reaction chamber, one of said pairs of electrodes being low frequency electrodes, and another pair of said electrodes being high frequency electrodes, each of said pairs of electrodes being separately spaced from and crossed one with respect to the other, means for supplying low frequency cyclic energy of a predetermined frequency to the low frequency electrodes, and separate means for simultaneously supplying high frequency energy of a substantially different frequency from said low frequency energy to the high frequency electrodes, the electrode gap between the low frequency electrodes being greater than that between the high frequency electrodes.

6. In a gas discharge apparatus for effecting the electrochemical transformation of gaseous material, the combination of a reactor having a reaction chamber, and means for producing cyclic electrical discharges of different frequencies and which cross each other to form a composite discharge, including a plurality of pairs of electrodes positioned internally of said reaction chamber, each of said pairs of electrodes being separately spaced and crossed one with respect to the other, means for supplying cyclic electrical energy of a predetermined frequency to one of said pairs of electrodes, separate means for simultaneously supplying cyclic electrical energy of a substantially different frequency to another of said pairs of electrodes, each of said electrodes being provided with a sheath member spaced from said electrodes and protecting the reaction chamber from heat effects, one of said sheath members being provided with a gas inlet and another of the sheath members being provided with a gas outlet, said sheath members directing the flow of gaseous material around and adjacent to the electrode terminals, and means for maintaining a pressure under one-half of an atmosphere in said chamber.

7. In a gas discharge apparatus for effecting the electrochemical transformation of gaseous material, the combination of a reactor having a reaction chamber provided with a plurality of pairs of opposing leg members having interior and exterior ends, the former terminating adjacent the center of said reaction chamber, closure members for the exterior ends of each of said leg members, sheath members mounted in each of said closure members and spaced from said leg members, each of said sheath members terminating adjacent the center of the reaction chamber, one of said sheath members being provided with a gas inlet and another of the sheath members being provided with a gas outlet, said sheath members directing the flow of gaseous material around and adjacent to the electrode terminals, closure members for the exterior ends of said sheath members which form supports for a plurality of pairs of electrodes, and means for producing cyclic electrical discharges to different frequencies and which cross each other to form a composite visible electrical discharge throughout the entire volume of space between the electrodes, including a plurality of pairs of electrodes positioned internally of said reaction chamber, each of said pairs of electrodes being separately spaced and crossed one with respect to the other, means for supplying cyclic electrical energy of a predetermined frequency to one of said pairs of electrodes, and separate means for simultaneously supplying cyclic electrical energy of a substantially different frequency to another of said pairs of electrodes.

8. In a gas discharge apparatus for effecting the electrochemical transformation of gaseous material, the combination of a reactor having a reaction chamber provided with a plurality of pairs of opposing leg members having interior and exterior ends, the former terminating adjacent the center of said reaction chamber, closure members for the exterior ends of each of said leg members, sheath members mounted in each of said closure members and spaced from said leg members, each of said sheath members terminating in the center of the reaction chamber, one of said sheath members being provided with a gas inlet and another of the sheath members being provided with a gas outlet, said sheath members directing the flow of gaseous material around and adjacent to the electrode terminals, closure members for the exterior ends of said sheath members which form supports for a plurality of pairs of electrodes, and means for producing cyclic electrical discharges of different frequencies and which cross each other to form a composite visible electrical discharge throughout the entire volume of space between the electrodes, including a plurality of pairs of electrodes positioned internally of said reaction chamber, each of said pairs of electrodes being separately spaced and crossed one with respect to the other, means for supplying cyclic electrical energy of a predetermined frequency to one of said pairs of electrodes, separate means for simultaneously supplying cyclic electrical energy of a substantially different frequency to another of said pairs of electrodes, and means for maintaining the pressure in said reaction chamber below about one-half of an atmosphere.

WILLIAM J. COTTON.

REFERENCES CITED

The following references are of record in the file of this patent:

UNITED STATES PATENTS

| Number | Name | Date |
|---|---|---|
| 546,702 | Koneman | Sept. 24, 1895 |
| 578,685 | Whitney | Mar. 9, 1897 |
| 644,510 | Frost | Feb. 27, 1900 |
| 672,231 | Lacomme | Apr. 16, 1901 |
| 696,647 | Lacomme | Apr. 1, 1902 |
| 902,607 | Roberts | Nov. 3, 1908 |
| 941,768 | Diffenbach et al. | Nov. 30, 1909 |
| 1,094,355 | Wilmowsky | Apr. 21, 1914 |
| 1,601,500 | Island | Sept. 28, 1926 |
| 1,912,373 | Jakosky et al. | June 6, 1933 |
| 2,080,929 | Rose | May 18, 1937 |
| 2,106,780 | Whittier | Feb. 1, 1938 |
| 2,313,028 | Siegmann | Mar. 2, 1943 |

FOREIGN PATENTS

| Number | Country | Date |
|---|---|---|
| 5,688 | Great Britain | 1904 |
| 176,144 | Great Britain | 1922 |
| 206,241 | Great Britain | 1923 |
| 223,271 | Great Britain | 1924 |
| 315,367 | Great Britain | 1930 |
| 297,773 | Germany | Dec. 23, 1915 |